G. N. GUTHREY.
MOTOR DRIVEN TIRE PUMP.
APPLICATION FILED MAR. 8, 1920.
1,368,139.
Patented Feb. 8, 1921.
2 SHEETS—SHEET 1.
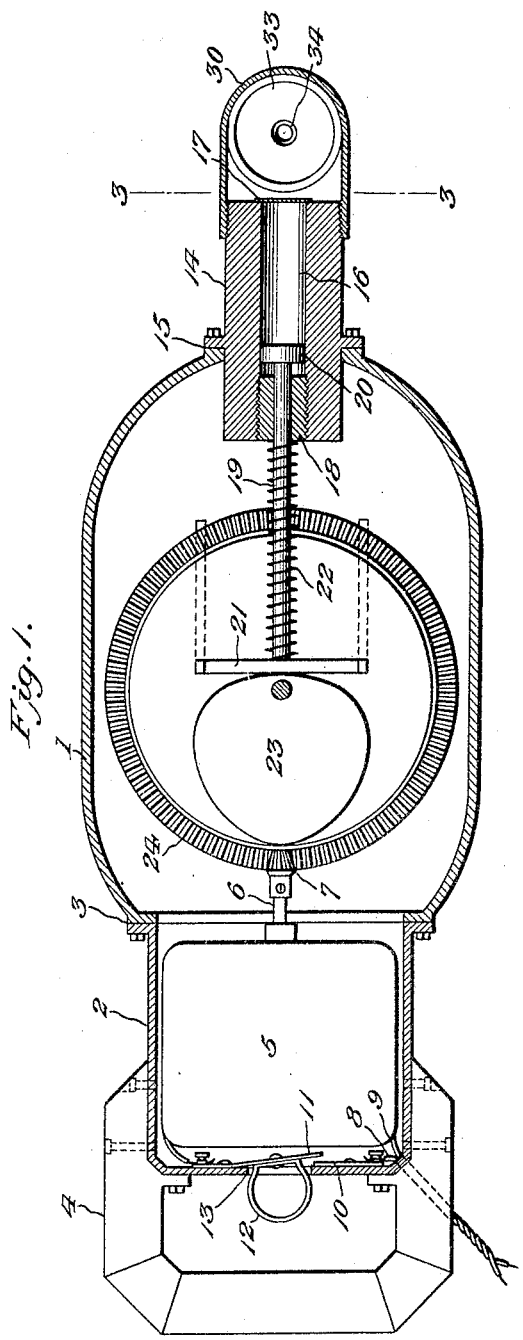
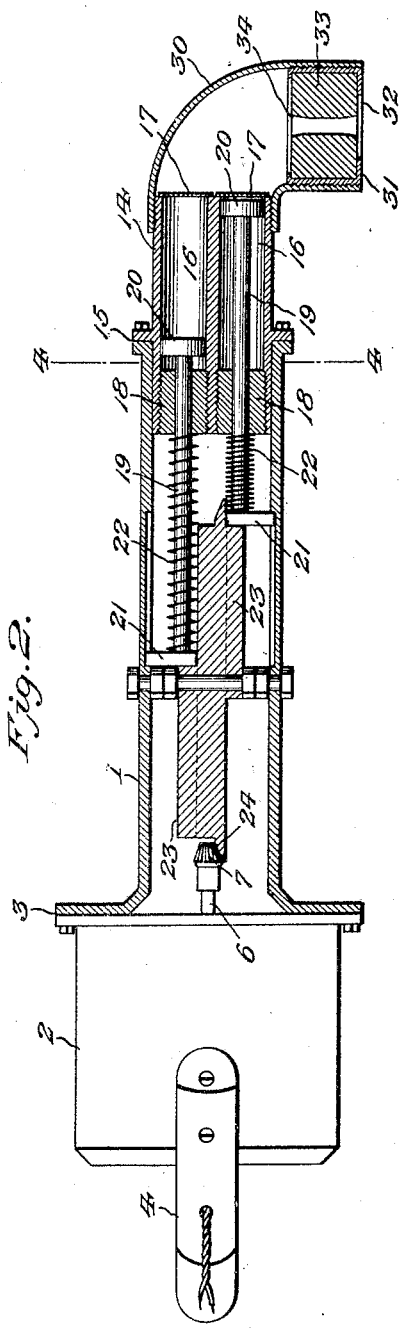
Gordon N. Guthrey INVENTOR
BY Victor J. Evans
ATTORNEY G. N. GUTHREY.
MOTOR DRIVEN TIRE PUMP.
APPLICATION FILED MAR. 8, 1920.
1,368,139.
Patented Feb. 8, 1921.
2 SHEETS—SHEET 2.
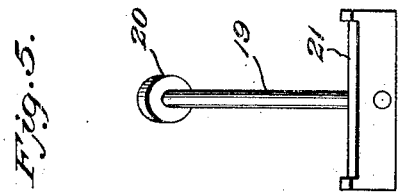
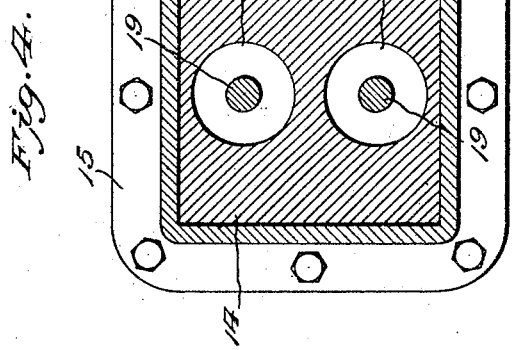
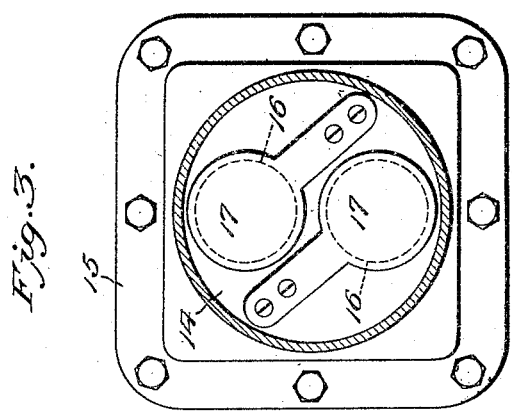
Gordon N. Guthrey INVENTOR
BY Victor J. Evans
ATTORNEY

UNITED STATES PATENT OFFICE.

GORDON N. GUTHREY, OF DALLAS, TEXAS.

MOTOR-DRIVEN TIRE-PUMP.

1,368,139.

Specification of Letters Patent.

Patented Feb. 8, 1921.

Application filed March 8, 1920. Serial No. 363,981.

*To all whom it may concern:*

Be it known that I, GORDON N. GUTHREY, a citizen of the United States, residing at Dallas, in the county of Dallas and State of Texas, have invented new and useful Improvements in Motor-Driven Tire-Pumps, of which the following is a specification.

The object of my present invention is the provision of a compact, efficient and durable motor-driven tire pump.

To the attainment of the foregoing, the invention consists in the improvement as hereinafter described and definitely claimed.

In the accompanying drawings, hereby made a part hereof:

Figures 1 and 2 are complete longitudinal sections at right angles to each other of my novel pump.

Fig. 3 is a section taken in the plane indicated by the line 3—3 of Fig. 1, and showing the non-return valves of the pump.

Fig. 4 is a transverse section on line 4—4 of Fig. 2.

Fig. 5 is a perspective showing one piston and its complementary cross-head as connected.

Similar numerals of reference designate corresponding parts in all of the views of the drawings.

Among other elements my novel pump comprises a major casing section 1 and an end casing section 2, connected at 3 to the section 1. On the casing section 2 is a handle 4 to facilitate convenient handling of the pump, and in the casing section 2 is an electric motor 5 the armature shaft 6 of which is provided with a beveled pinion 7. At 8 and 9 are conductors for electrically connecting the motor 5 with a source of electrical energy. The conductor 9 includes switch members 10 and 11, carried by the casing section 2, and the member 11 is resilient, and therefore normally rests out of contact with the member 10. Said member 11, however, is equipped with a handle 12 adapted to play through an opening 13 in the end wall of the section 2, and consequently all that is necessary to complete the circuit through the conductor 9 is for the operator to grasp the handle 12 and thereby hold the member 11 against the member 10. Manifestly the handle 12 will be either insulated from the switch member 11 or will be formed of insulating material. The conductors 8 and 9 are preferably covered by insulation, and are adapted when the pump is to be put into use, to be electrically connected in the ordinary manner with the storage battery of an automobile.

At 14 is the cylinder section of the pump. The said section 14 is exteriorly flanged at 15 and bolted to the end of the casing section 1. In the said section 14 are formed cylinder bores 16 that extend throughout the length thereof, and connected and opposed to the outer end of the section 14 are non-return valves 17 of the flap-type, there being one of said valves 17 to each cylinder bore 16. The inner ends of the cylinder bores 16 are closed by cushions 18, and guided in said cushions are the rods 19 of pistons 20. Each of the said piston rods 19 is connected through an appropriately guided cross-head 21, and interposed between the said cross-head and the inner end of the cushion complementary to said rod is a coiled spring 22 the function of which is to move the piston rod inwardly. The cross-heads 21 are opposed to the perimeters of reversely arranged cams 23, and the said cams 23 are fixed with respect to a beveled gear 24; the said beveled gear 24 being appropriately mounted in the casing section 1, and being intermeshed with the pinion 7. By virtue of the construction just described, it will be manifest that when current is supplied to the electrical motor 5, the pistons 20 will be reciprocated and one piston will be forced outwardly coincident with the inward movement of the other.

Threaded on the outer end of the cylinder section 14 is an elbow casing section 30, and threaded on the outer end of the said elbow casing section 30 is a cap 31 in which is an opening 32 of about the proportional diameter illustrated. Disposed in the outer end portion of the section 30 and retained in position by the cap 31 is an annulus 33 of vulcanized rubber or analogous material, the aperture 34 of which is of a size to receive the inflating tube of a tire when the said tube is crowded into the aperture. Manifestly the fit of the annulus 33 about the inflating tube of the tire will be so tight as to prevent the leakage of air between the tube, on the one hand, and the annulus, on the other.

It will be gathered from the foregoing that my novel pump is susceptible of being readily applied to and held in working position on the inflating tube of a tire, and that it is also susceptible of being readily connected with a source of electrical energy, so that when the switch formed by the members 10 and 11 is closed, the pump will serve to expeditiously inflate a tire.

My novel pump is designed more especially to be carried in the tool box of an automobile, but it will be understood that it is within the purview of my invention to make the pump of various sizes, one size to be operated in a garage or in a service station, in which event its motor 5 would be either permanently or detachably connected with the house wires of the garage or service station.

Having described my invention, what I claim and desire to secure by Letters-Patent is:

In a motor-driven tire pump, a major casing section, an end casing section connected to one end of the major section and having a handle and also having an opening in its end wall, an electric motor arranged in the end casing section and having an armature shaft and a gear thereon, conductors complementary to the electric motor, one of said conductors comprising switch members one of which is movable relatively to the other and is provided with a handle movable through the opening in the end casing section, a gear revoluble in the major casing section and engaged with the gear on the armature shaft, reversely arranged cams revoluble with said gear, a cylinder section connected to the end of the major casing section remote from the end casing section and having cylinder bores, pistons movable rectilinearly in said bores and having rods and cross-heads on the rods, said cross-heads guided in the major casing section and opposed to the perimeters of the cams, springs to move the pistons inwardly, flap valves opposed and connected to the outer end of the cylinder section and controlling the outer ends of the cylinders, an elbow casing section secured on the outer end of the cylinder section, a cap secured on the outer end of the elbow casing section and having an opening, and a resilient annulus secured by the cap in the elbow casing section and having an aperture adapted to receive the inflating tube or valve tube of a tire.

In testimony whereof I affix my signature.

GORDON N. GUTHREY.